US011331602B2

(12) United States Patent
Hussain

(10) Patent No.: US 11,331,602 B2
(45) Date of Patent: May 17, 2022

(54) FUEL FILTER WITH ROTATABLE SLEEVE

(71) Applicant: Champion Laboratories, Inc., Albion, IL (US)

(72) Inventor: Zafar Hussain, Albion, IL (US)

(73) Assignee: CHAMPION LABORATORIES, INC., Albion, IL (US)

( * ) Notice: Subject to any disclaimer, the term of this patent is extended or adjusted under 35 U.S.C. 154(b) by 0 days.

(21) Appl. No.: 16/594,973

(22) Filed: Oct. 7, 2019

(65) Prior Publication Data

US 2020/0108336 A1 Apr. 9, 2020

Related U.S. Application Data

(60) Provisional application No. 62/742,098, filed on Oct. 5, 2018.

(51) Int. Cl.
*B01D 29/03* (2006.01)
*B01D 29/00* (2006.01)
*B01D 46/52* (2006.01)
*B01D 29/21* (2006.01)

(52) U.S. Cl.
CPC ......... *B01D 29/0036* (2013.01); *B01D 29/21* (2013.01); *B01D 46/521* (2013.01)

(58) Field of Classification Search
CPC .. B01D 29/0036; B01D 46/521; B01D 29/21; B01D 29/925; B01D 35/153; B01D 2201/4053; B01D 2201/0415; B01D 2201/291
See application file for complete search history.

(56) References Cited

U.S. PATENT DOCUMENTS 5,667,678 A * 9/1997 Dye .................... B01D 29/111
   210/232
2016/0038861 A1* 2/2016 Wildermuth ......... B01D 35/153
   210/232

* cited by examiner

*Primary Examiner* — Waqaas Ali
(74) *Attorney, Agent, or Firm* — Bryan Cave Leighton Paisner LLP

(57) ABSTRACT

A filter for filtering contaminants from a fluid. The filter includes a cylinder of pleated filter media, a first end cap coupled to a first end of the filter media and a second end cap coupled to a second end of the filter media. The second end cap including a wall formed to include a central opening. The filter also includes a central core positioned radially inward of filter media and extends from the first end cap to the second end cap. The central core has a cylindrical side wall that is formed to include a plurality of apertures that are adapted to allow for the passage of the fluid. The filter also includes an annular collar that is adapted to be positioned within the central core. The annular collar is adapted to be rotatable with respect to the central core and includes a sidewall formed to include a series of space projections that extend radially inwardly from the sidewall.

17 Claims, 10 Drawing Sheets

_US 11,331,602 B2_

FUEL FILTER WITH ROTATABLE SLEEVE

CROSS-REFERENCE TO RELATED U.S. PATENT APPLICATION

This present application claims priority under 35 U.S.C. § 119(e) to U.S. Provisional Patent Application Ser. No. 62/742,098, filed on Oct. 5, 2018, the disclosure of which is hereby incorporated by reference in its entirety.

BACKGROUND

The present disclosure relates to fluid filters, and more particularly to fuel filters for motor vehicles.

Fuel filters are produced in many configurations. One type of fuel filter includes a filter element that fits into filter housing. This type of filter is in the form of a replaceable cylindrical shaped pleated element that can be removed and replaced from the filter housing. The filter element ensures that particulate matter and other impurities are removed from fuel before it is delivered to the fuel injection system.

The filter housing, which is typically permanently attached to the vehicle, includes a central pipe that extends axially within the housing and connected to the outlet port. The pipe includes a central fluid passage and an opening into the passage toward the lower end of the pipe.

The housing also includes a valve structure having a valve device and a latch device, with the valve device including a sleeve concentrically located around the pipe. The valve device also includes a base surrounding the sleeve and a series of radially-outward projecting tabs are spaced around the periphery of the base. The filter housing includes a removable lid and the latch device is located between the valve device and the lower end of the housing. The engagement surface of the latch device faces upwardly in the housing and against the base of the valve device.

SUMMARY

In illustrative embodiments, the filter includes a cylindrical shaped band of filter media having a central axis. The filter media is connected at its upper and lower ends to first and second end caps.

In illustrative embodiments, the filter also includes a central core positioned radially inward of filter media and extends from the first end cap to the second end cap. The central core has a cylindrical side wall that is formed to include a plurality of apertures that are adapted to allow for the passage of the fluid. The filter also includes an annular collar that is adapted to be positioned within the central core.

In illustrative embodiments, the annular collar of filter is adapted to rotate within the filter about the central axis. The annular collar includes a plurality of projections that engage a valve within the housing. Rotation of the collar allows the projections to properly align with the valve so that the filter is accepted within the housing.

DETAILED DESCRIPTION

The principles, preferred embodiments and modes of operation of the present disclosure have been described in the foregoing specification. The disclosure, which is intended to be protected herein, should not be construed as limited to the particular form described as it is to be regarded as illustrative rather than restrictive. Variations and changes may be made by those skilled in the art without departing from the scope and spirit of the invention as set forth in the appended claims.

Figure 1:
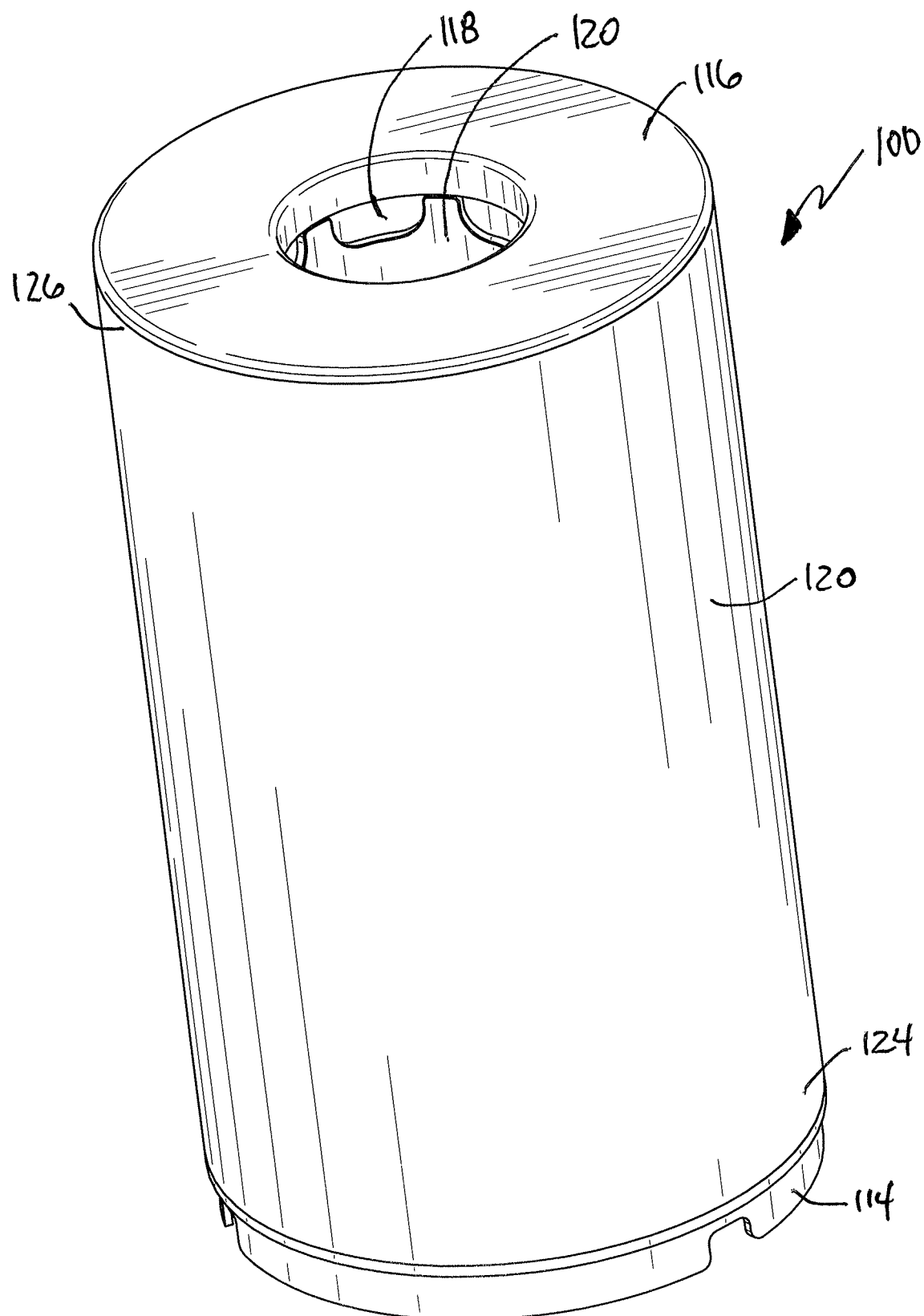
FIG. 1 is a perspective view of the filter element of the present invention.
Figure 2:
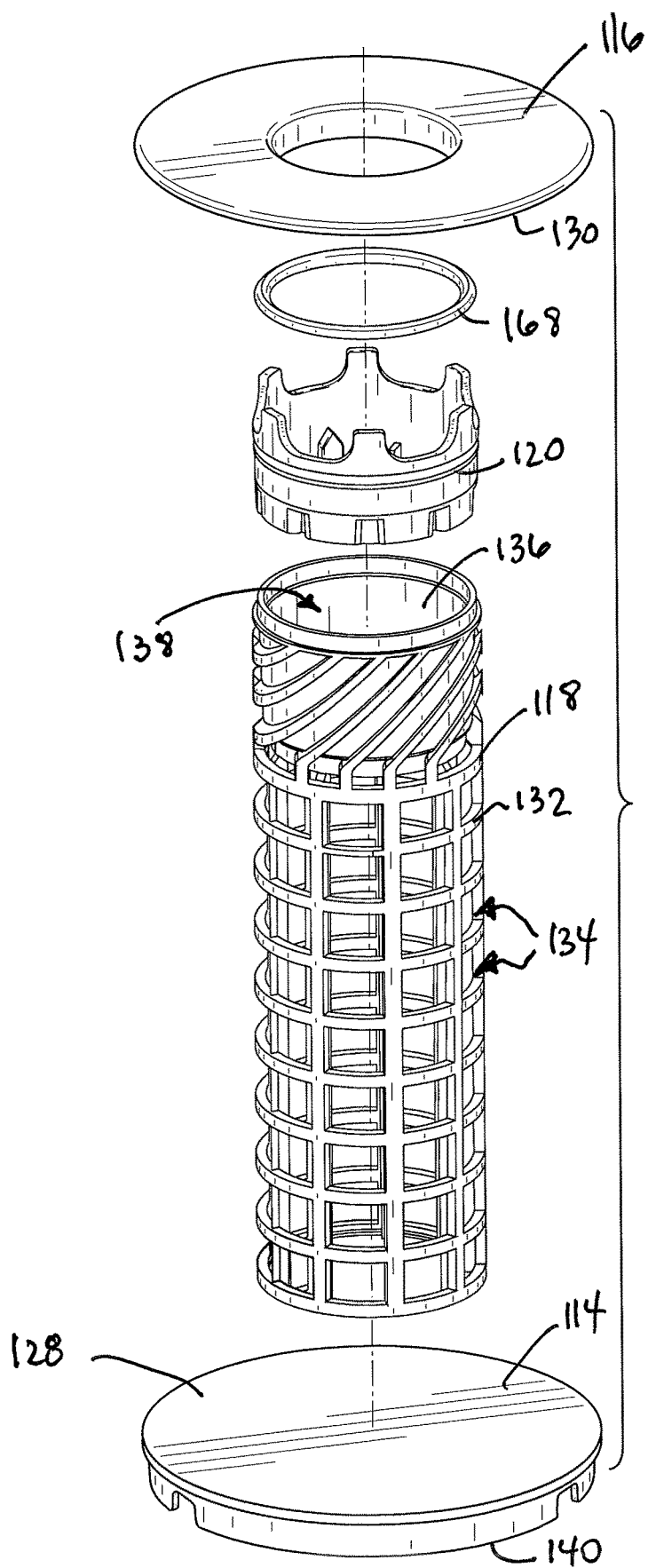
FIG. 2 is an exploded view of the center core of the filter element.

Referring now to the drawings, a filter 100 is shown for use in a fuel system having a housing (not shown), as shown in the perspective view of FIG. 1 and the exploded view of a central core 18 of FIG. 2. The housing, in which the filter is used, includes a cylindrical cavity adapted to accept filter 100. The housing includes a cap or cover to seal filter 100 within the housing. Filter 100 is adapted to remove particulate matter and other contaminates from the fuel supply before reaching other fuel system components, such as fuel injectors and fuel pumps.

Filter 100 includes a cylinder of pleated filter media 120 having a first end 124 and a spaced apart second end 126, as shown in FIG. 1. Filter 100 also includes a first end cap 114 and a spaced apart second end cap 116. First end cap 114 includes a first side 128 that is bonded to first end 124 of filter media 112 and second end cap 116 includes a first side 130 that is bonded to second end 126 of filter media 112, as shown in FIG. 2. End caps 114, 116 can be secured to filter media 112 by use of an adhesive or by other securement means such as sonic welding or spun bonding.

Filter 100 includes central core 118 that is positioned radially inward of filter media 112, as shown in FIG. 2. Central core 118 includes a cylindrical side wall 132 formed to include a plurality of apertures 134 that are adapted to allow for the passage of fluid. Central core 118 also includes an interior wall 136 that is formed to include a central opening 138. Central opening 138 is adapted to accept a central pipe of the housing (not shown). Apertures 134 are positioned below the interior wall 36. Central core 118 is adapted to extend from the first end cap 114 to the second end cap 116 through the center of the filter 100, internal to the filter media 112.

Figure 3:
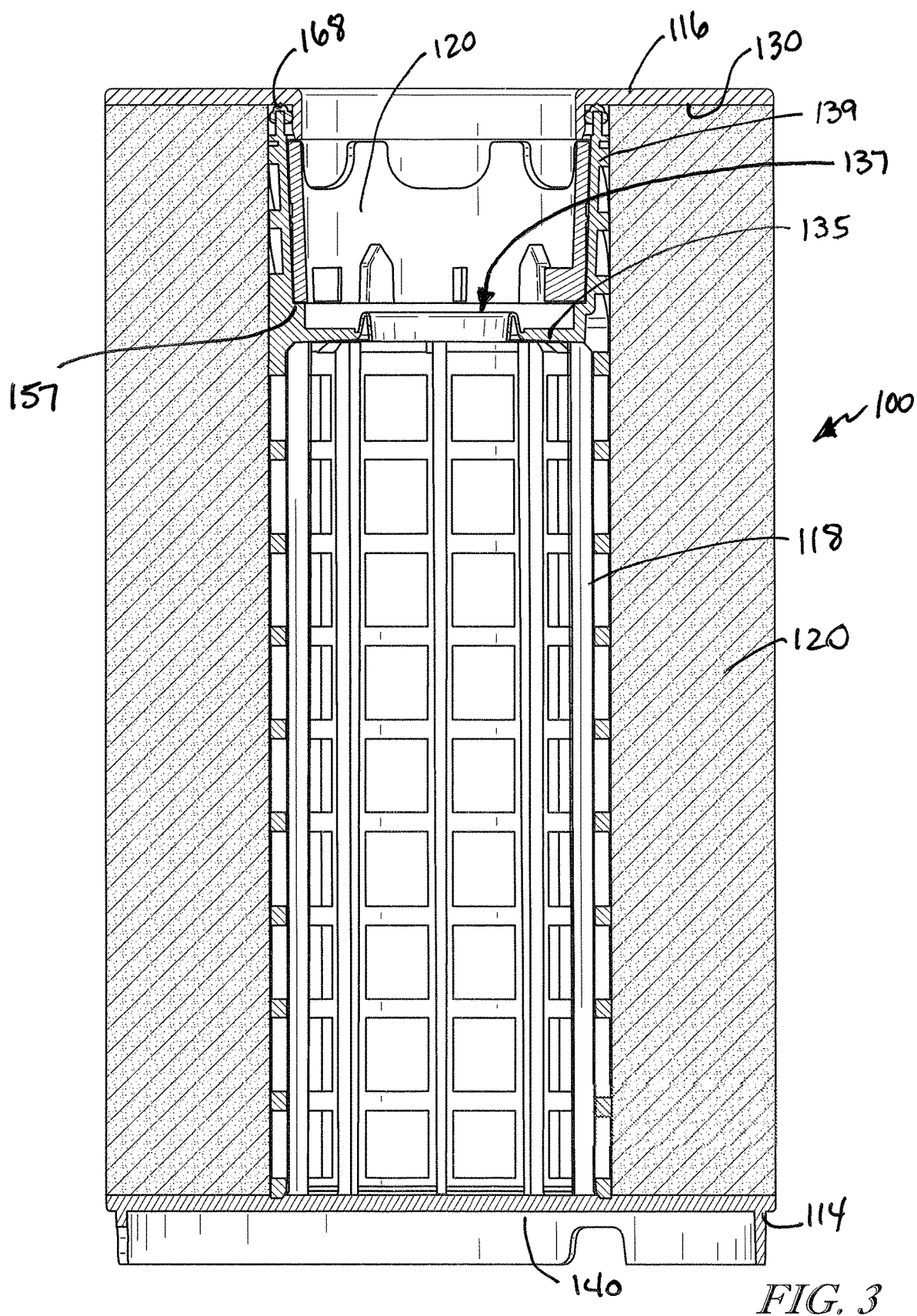
FIG. 3 is a section view taken along line 3-3 of FIG. 1.
Figure 8:
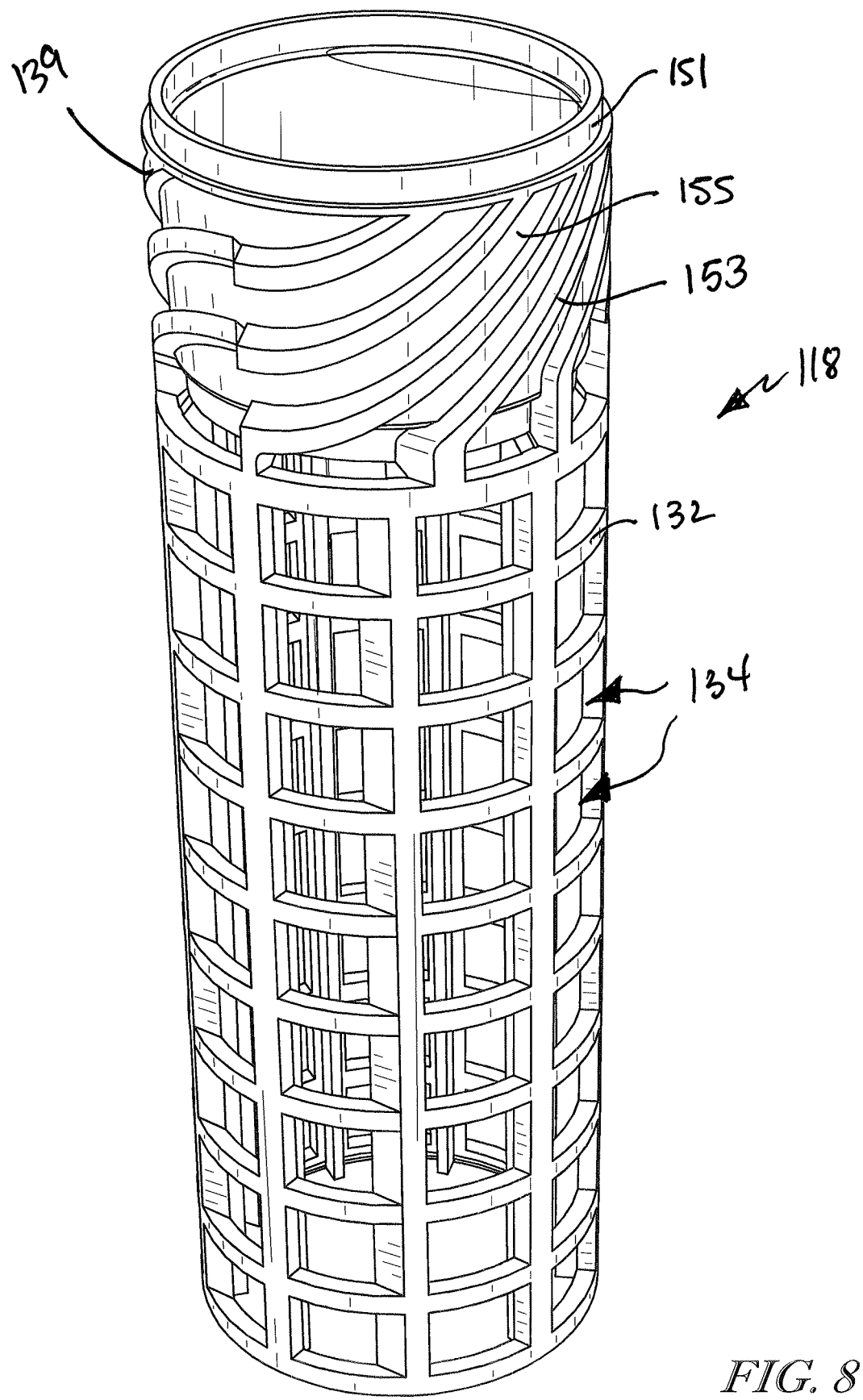
FIG. 8 is a perspective view of the core.

Central core 118 also includes a wall section 135 that is formed to include a central opening 137. Wall section 135 is closer to a second end 139 of the central core 118 than the first end 141. Central core 118 also includes a reduced wall thickness region 151 at the second end 139, as shown in FIG. 8. Reduced wall thickness 151 is adapted to accept a gasket 168. Gasket 168 is used to allow central core 118 to create a seal with second end cap 116. Central core 118 also includes spiral fins or ribs 153 formed on an outer surface 155 of the central core 118. Fins 153 cause fuel that engages the core 118 to rotate about the core 118. The central core 118 includes a step 157 formed in an interior surface of the central core 118, as shown in FIG. 3. The step adapted to support the annular collar 120 within the central core 118.

Figure 6:
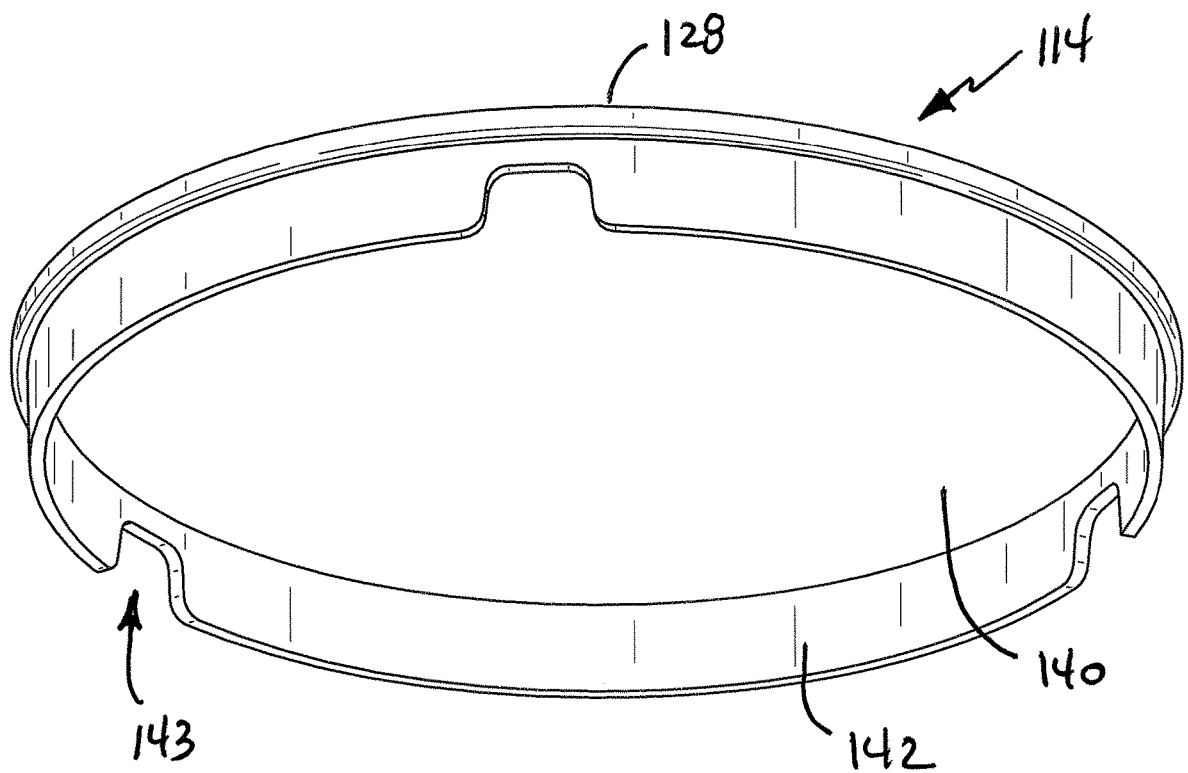
FIG. 6 is a perspective view of the lower end cap.
Figure 7:
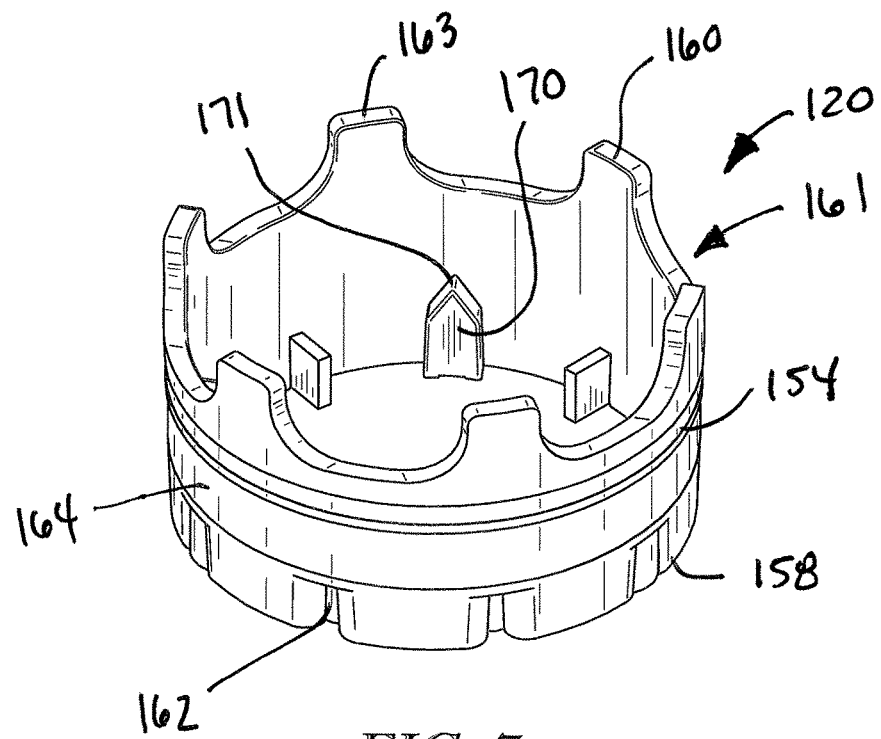
FIG. 7 is a perspective view of the rotatable collar

First end cap 114 is generally planar and includes the first side 128 and a spaced apart second side 140, as shown in FIG. 6. Second side 140 of first end cap 114 includes an outer annular skirt 142 that extends away from second side 140. First end cap 114 can be coupled to central core 118 by use of an adhesive, spun bonding or other means known to those of skill in the art. Skirt 142 is formed to include cutouts 143 formed around the perimeter of the skirt 142.

Figure 4:
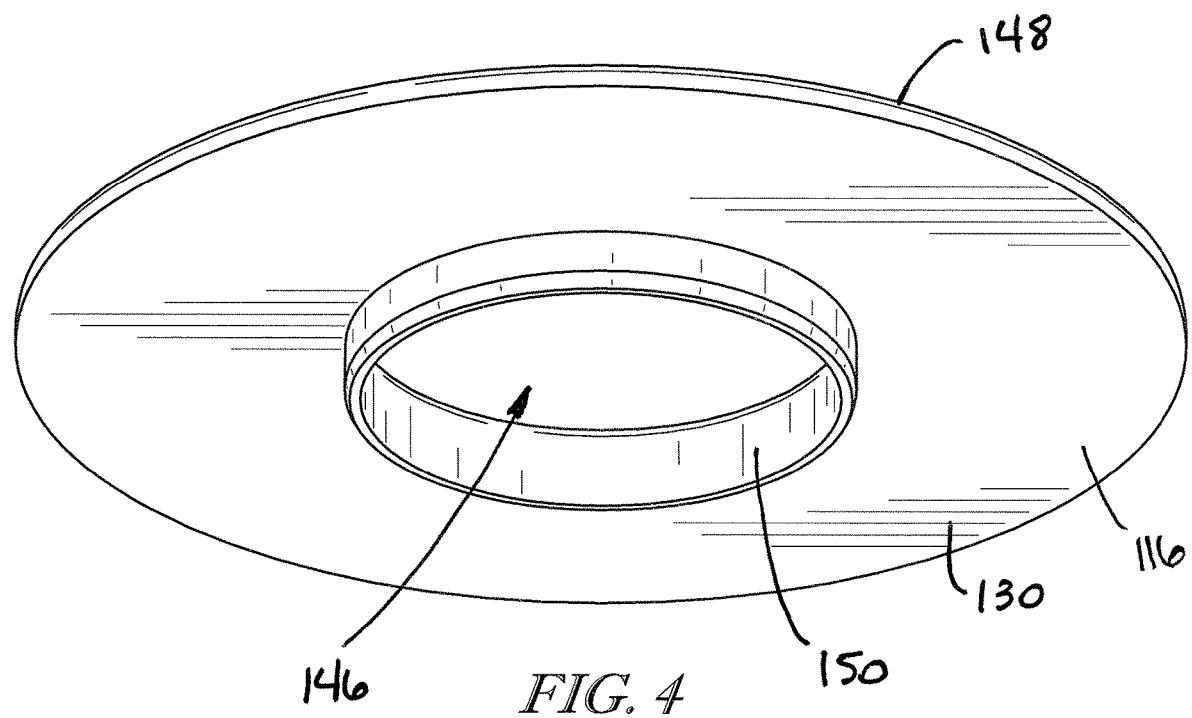
FIG. 4 is a perspective view of the upper end cap of the filter element.
Figure 5:
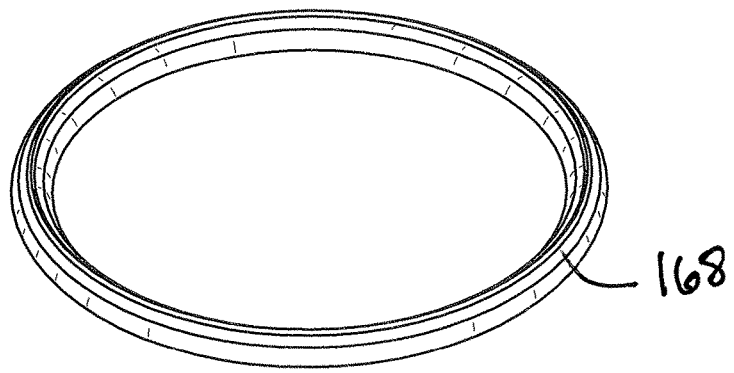
FIG. 5 is a perspective view of a seal within the filter element.

The second end cap 116 is a generally planar disc that is formed to include a central opening 146, as shown in FIG. 4. Second end cap 116 includes first side 130 and a spaced apart second side 148. First side 130 includes an inner annular flange 150. Central opening 146 is positioned radially inward from the inner annular flange 150. First side 130 of second end cap 116 is connected to the second end 126 of the filter media 112 by use of an adhesive, sonic welding or other connection means know to those of skill in the art.

Filter 100 also includes annular collar 120 that is positioned within the center of filter media 112 and positioned partially within central core 118. Annular collar 120 includes a sidewall 154. Annular collar 120 has an exterior diameter that is less than the inner diameter of the central core 118 so that annular collar 120 floats within central core 118 between second endcap 116 and central core 118 and can rotate with respect to central core 118. Annular collar 120 also includes a bottom edge 158 and a top edge 160. Top edge 160 of annular collar 12 is scalloped in appearance and includes a series of arcuate recesses 161 and crowns 163. Side wall 154 of annular collar 120 includes a series of spaced apart annular recesses 162 disposed about an outer surface 164 of side wall 154. Annular collar 120 is not connected or secured to second end cap 116 of the filter 100. Annular collar 120 also includes a plurality of inward projections 170. Projections 170 extend radially inward from side wall 154 of annular collar 120. Projections 170 are adapted to engage a valve mechanism on the filter housing (not shown). Several of projections 170 include tapered tips 171 that allow projections 170 to rotate annual collar 120 to align the projections 170 with the valve mechanism within the housing. Since annular collar 120 is allowed to freely rotate within the central core 118 projections 170 can align with the valve mechanism in the housing.

During assembly, annular collar 120 is positioned within central core 118 and central core 118 is positioned within the center of the filter media 112. First end cap 114 is secured to the filter media 112 by use of an adhesive in the preferred embodiment. Next, central core 118 is fitted with o-ring 168 and positioned within filter media 112. When annular collar 120 is positioned within central core 118, annular collar 120 is loose and allowed to rotate and move slightly in the axial direction. Next, second end cap 116 is connected to second end 126 of filter media 112. When second end cap 116 is coupled to filter media 112, o-ring 168 of central core 11 contacts second end cap 116 to create a fluid seal.

Figure 9:
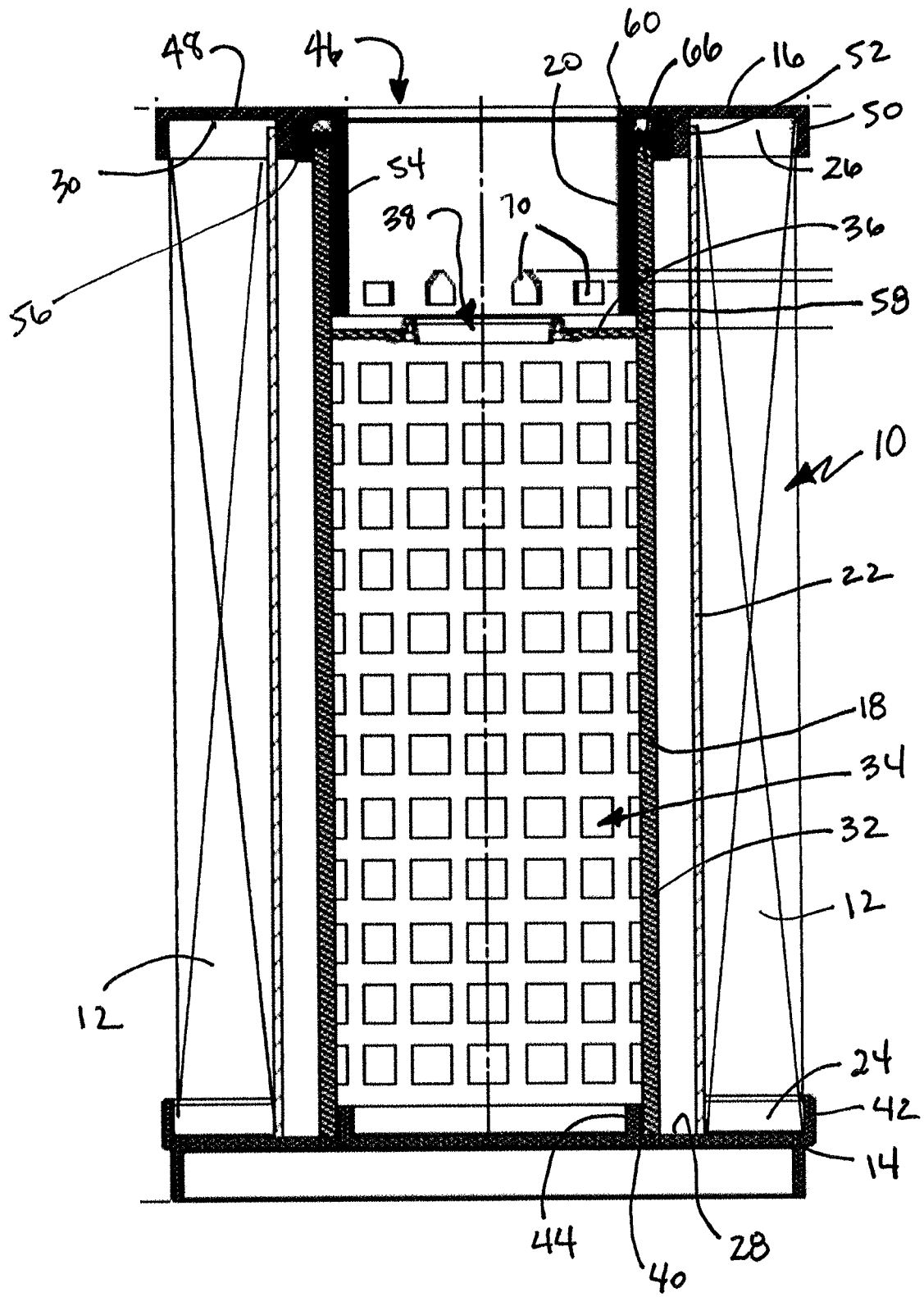
FIG. 9 is a sectional view of another embodiment of the filter element.
Figure 10:
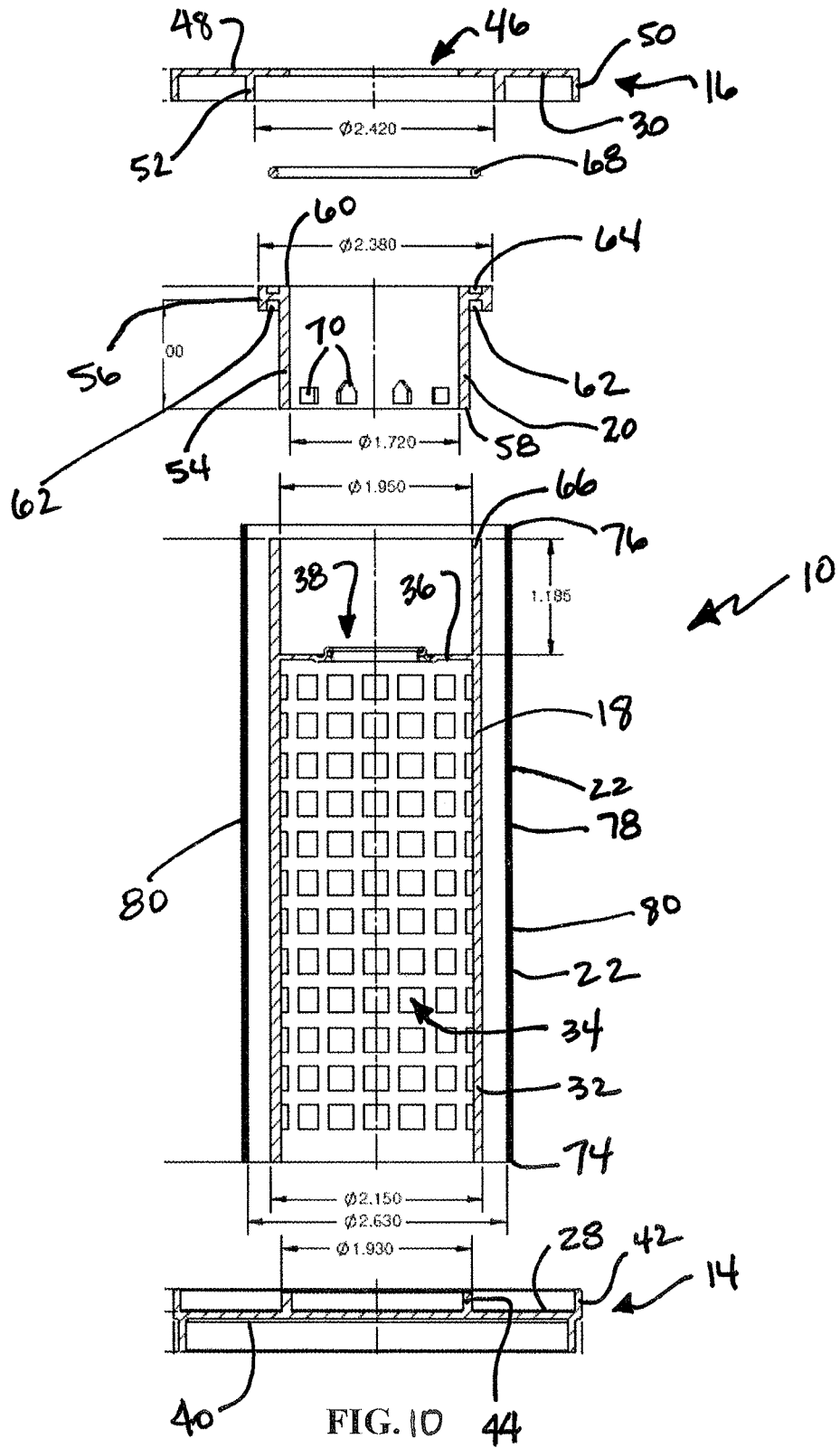
FIG. 10 is an exploded view of the filter of FIG. 9.
Figure 11:
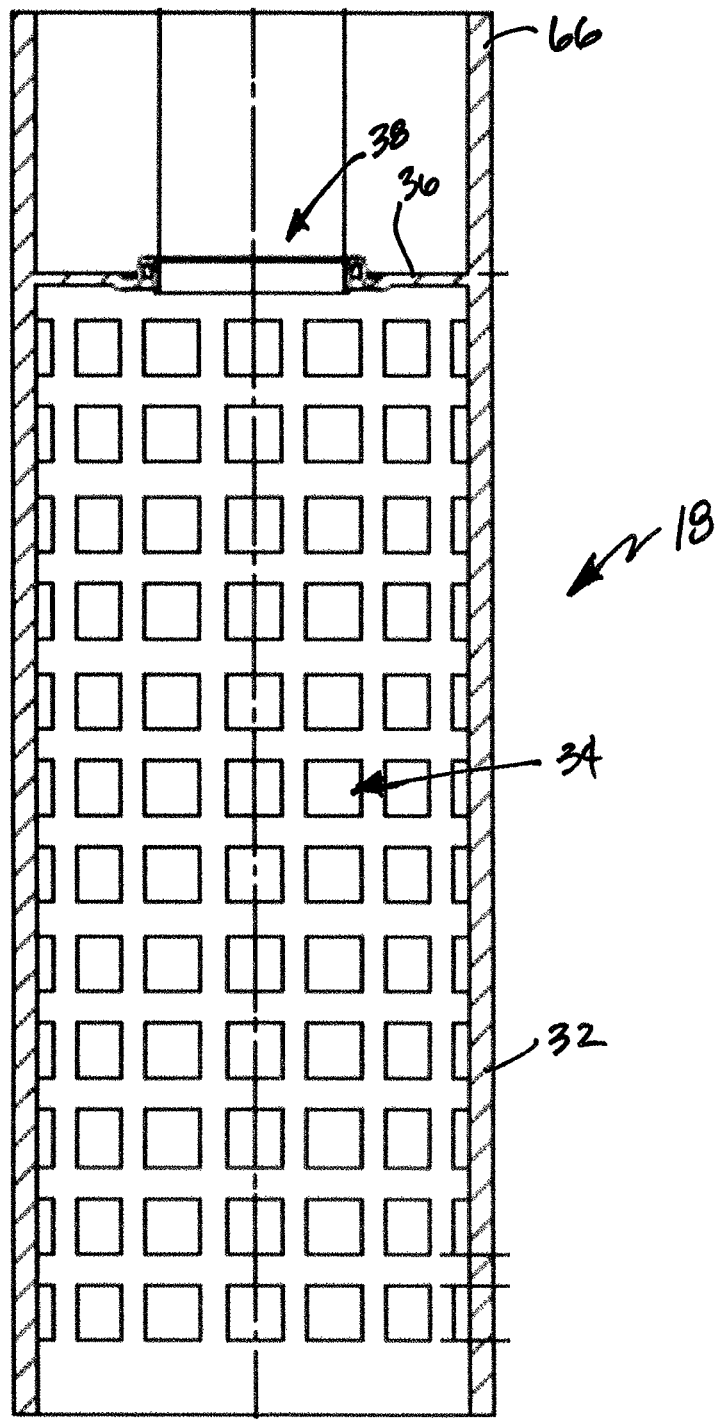
FIG. 11 is sectional view of the central core.
Figure 12:
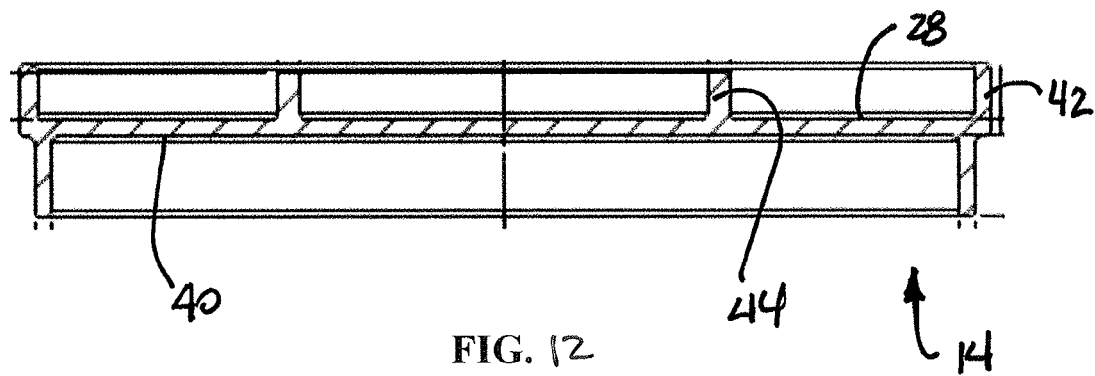
FIG. 12 is sectional view of the first end cap.
Figure 13:
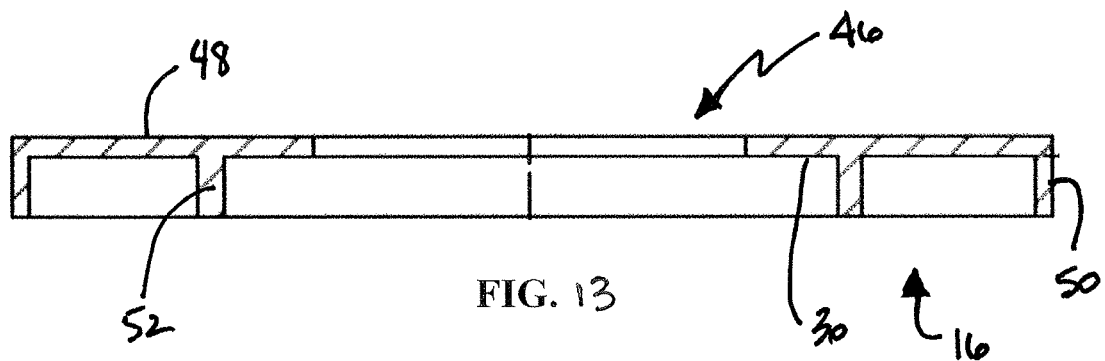
FIG. 13 is a sectional view of the second end cap.
Figure 14:
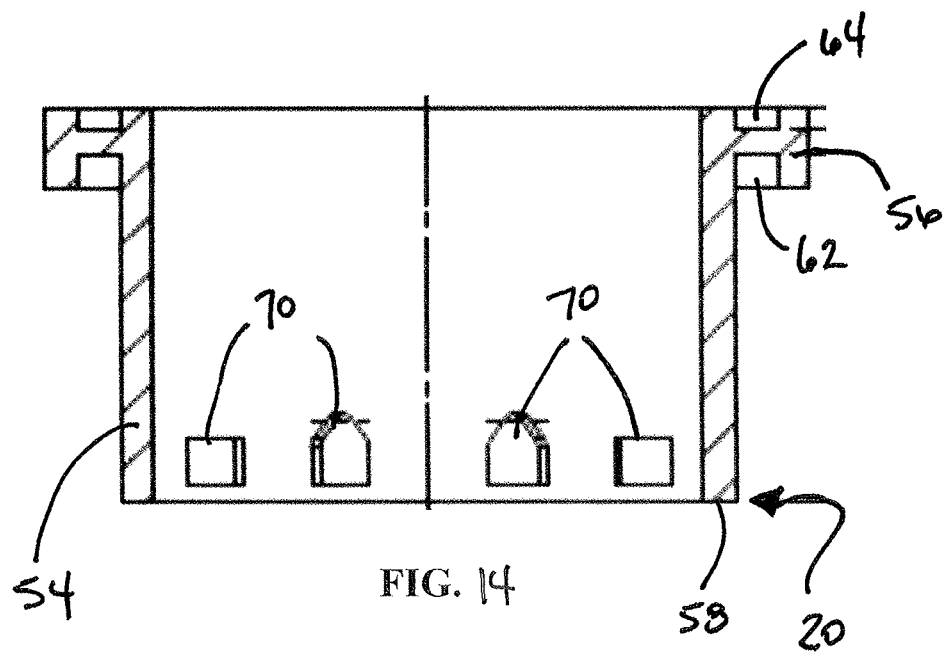
FIG. 14 is a sectional view of the annular collar.

Referring now to the drawings, a filter 10 is shown for use in a fuel system having a housing (not shown), as shown in the sectional view of FIG. 9 and the exploded view of FIG. 10. The housing, in which the filter is used, includes a cylindrical cavity adapted to accept filter 10. The housing includes a cap or cover to seal filter 10 within the housing. Filter 10 is adapted to remove particulate matter and other contaminates from the fuel supply before reaching other fuel system components, such as fuel injectors and fuel pumps.

Filter 10 includes a cylinder of pleated filter media 12 having a first end 24 and a spaced apart second end 26. Filter 10 also includes a first end cap 14 and a spaced apart second end cap 16. First end cap 14 includes a first side 28 that is bonded to first end 24 of filter media 12 and second end cap 16 includes a first side 30 that is bonded to second end 26 of filter media 12. End caps 14, 16 can be secured to filter media 12 by use of an adhesive or by other securement means such as sonic welding.

Filter 10 also include a central core 18 that is positioned radially inward of filter media 12. Central core 18 includes a cylindrical side wall 32 formed to include a plurality of apertures 34 that are adapted to allow for the passage of fluid. Central core 18 also includes an interior wall 36 that is formed to include a central opening 38. Central opening 38 is adapted to accept a central pipe of the housing (not shown). Apertures 34 are positioned below the interior wall 36. Central core 18 is adapted to extend from the first end cap 14 to the second end cap 16 through the center of the filter 10, internal to the filter media 12.

First end cap 14 is generally planar and includes the first side 28 and a spaced apart second side 40. First side 28 of filter includes an outer annular flange 42 and an inner annular flange 44 that is concentric with the outer annular flange 42. Inner annular flange 44 is adapted to be positioned radially inward of central core 18 when filter 10 is assembled. First end cap 14 can be coupled to central core 18 by use of an adhesive, spun bonding, resistance fit or other means known to those of skill in the art. Second side 40 of first end cap 14 also includes an annular flange that extends outwardly from the first end cap 14.

The second end cap 16 is a generally planar disc that is formed to include a central opening 46. Second end cap 16 includes first side 30 and a spaced apart second side 48. First side 30 includes an outer annular flange 50 and an inner annular flange 52 that is concentric with the outer annular flange 50. Central opening 46 is positioned radially inward from the inner annular flange 52. First side 30 of second end cap 16 is connected to the second end 26 of the filter media 12 by use of an adhesive, sonic welding or other connection means know to those of skill in the art.

Filter 10 also includes annular collar 20 that is positioned within the center of filter media 12 and positioned partially within central core 18. Annular collar 20 includes a sidewall 54 and an annular flange 56 that extends outward from the sidewall 54. Annular collar 20 also includes a bottom edge 58 and a top edge 60. Flange 56 includes a lower annular groove 62 and an upper annular groove 64. Lower annular groove 62 is adapted to accept an upper edge 66 of central core 18. Lower annular groove 62 can created a fluid seal when mated with the central core 18. When annular collar 20 is placed over central core 18, bottom edge 58 is spaced apart from interior wall 36 of central core 18 so that there is a gap between the two components. Upper annular groove 64 is adapted to accept an o-ring 68. O-ring 68 is adapted to touch first side 30 of second end cap 16 to form a seal between the o-ring and the second end cap 16.

Flange 56 of annular collar 20 is adapted to be positioned radially inward of inner flange 52 of second end cap 16 when filter 10 is assembled. Annular collar 20 is not connected or secured to second end cap 16 of the filter 10. Annular collar 20 also includes a plurality of inward projections 70. Projections 70 extend radially inward from side wall 54 of annular collar 20. Projections 70 are adapted to engage a valve mechanism on the filter housing (not shown).

Filter 10 also includes an annular reinforcing sleeve 72. Reinforcing sleeve 72 includes a first end 74 and a spaced apart second end 76. Reinforcing sleeve 72 includes a side wall 78 that is formed to include a series of perforations 80. Reinforcing sleeve 72 is adapted to extend from the first end cap 14 to the second end cap 16. First end 74 of reinforcing sleeve 72 is connected to the first end cap 14 by use of an adhesive, sonic welding or other attachment means. Second end 76 of reinforcing sleeve 72 is connected to second end cap 16 by use of an adhesive, sonic welding, or other attachment means.

During assembly, central core 18 and reinforcing sleeve 72 are positioned within the center of the filter media 12. First end cap 14 is secured to the filter media 12 by use of an adhesive in the preferred embodiment. Next, annular collar 20 is fitted with o-ring 68 and positioned within central core 18. When annular collar 20 is positioned within central core 18, bottom edge 58 is spaced apart from interior wall 36. Side wall 54 of annular collar 20 may also include a keyway on an outer surface that engages a groove formed in side wall of central core 18 to prevent annular collar 20 from rotating with respect to central core 18. Next, second end cap is connected to second end 26 of filter media 12. When second end cap 16 is coupled to filter media 12, o-ring 68 of annular collar 20 contacts second end cap 16 to create a fluid seal.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A filter for filtering contaminants from a fluid comprising:
    a cylinder of pleated filter media having a first end and a spaced apart second end;
    a first end cap coupled to a first end of the filter media and a second end cap coupled to a second end of the filter media, the second end cap including a wall formed to include a central opening and an annular flange extending away from the wall;
    a central core positioned radially inward of filter media and extending from the first end cap to the second end cap, the central core having a cylindrical side wall formed to include a plurality of apertures that are adapted to allow for the passage of the fluid;
    an annular collar that is positioned within the central core and retained between the first and second end caps, the annular collar is positioned closer to the second end cap than the first end cap and is adapted to be rotatable with respect to the filter media, the annular collar having a sidewall formed to include a series of space projections that extend radially inwardly from the sidewall and at least one of the space projections include a tapered tip that is situated near a bottom edge of the annular collar to assist in aligning the annular collar, wherein fluid contacting the filter travels radially inwardly through the filter media, into the central core and out through the central opening.

2. The filter of claim 1, wherein the annular collar includes a plurality of scallops at one end that include cutout regions positioned between crown regions.

3. The filter of claim 1, where in the central core includes an interior wall having an aperture.

4. The filter of claim 3, wherein the annular collar is positioned between the second end cap and the interior wall of the central core when the filter is assembled.

5. The filter of claim 4, wherein the annular collar can move axially with respect to the central core when the filter is assembled.

6. The filter of claim 1, wherein the central core include a series of radial fins formed on an exterior surface of the central core, the fins adapted to cause the fuel to rotate about at least a portion of the core.

7. The filter of claim 1, wherein the central core includes a gasket at one end that is adapted to engage the second end cap to create a fluid tight seal.

8. The filter of claim 1, wherein the central core includes a step formed in an interior surface of the central core, the step adapted to support the annular collar within the central core.

9. A filter for filtering contaminants from a fluid comprising:
    a cylinder of pleated filter media having a first end and a spaced apart second end;
    a first end cap coupled to a first end of the filter media and a second end cap coupled to a second end of the filter media, the second end cap including a wall formed to include a central opening and an annular flange extending away from the wall;
    a central core positioned radially inward of filter media and extending from the first end cap to the second end cap, the central core having a cylindrical side wall formed to include a plurality of apertures that are adapted to allow for the passage of the fluid;
    an annular collar that is positioned within the central core and retained between the first and second end caps, the annular collar is positioned closer to the second end cap than the first end cap and is adapted to be rotatable with respect to the filter media, the annular collar having a sidewall formed to include a series of space projections that extend radially inwardly from the sidewall and at least one of the space projections include a tapered tip that is situated near a bottom edge of the annual collar to assist in aligning the annular collar, wherein fluid contacting the filter travels radially inwardly through the filter media, into the central core and out through the central opening, the central core includes a step formed in an interior surface of the central core, the step adapted to support the annular collar within the central core.

10. The filter of claim 9, wherein the annular collar includes a plurality of scallops at one end that include cutout regions positioned between crown regions.

11. The filter of claim 9, where in the central core includes an interior wall having an aperture.

12. The filter of claim 11, wherein the annular collar is positioned between the second end cap and the interior wall of the central core when the filter is assembled.

13. The filter of claim 12, wherein the annular collar can move axially with respect to the central core when the filter is assembled.

14. The filter of claim 9, wherein the central core include a series of radial fins formed on an exterior surface of the central core, the fins adapted to cause the fuel to rotate about at least a portion of the core.

15. The filter of claim 9, wherein the central core includes a gasket at one end that is adapted to engage the second end cap to create a fluid tight seal.

16. A filter for filtering contaminants from a fluid comprising:

a cylinder of pleated filter media having a first end and a spaced apart second end;

a first end cap coupled to a first end of the filter media and a second end cap coupled to a second end of the filter media, the second end cap including a wall formed to include a central opening and an annular flange extending away from the wall;

a central core positioned radially inward of filter media and extending from the first end cap to the second end cap, the central core having a cylindrical side wall formed to include a plurality of apertures that are adapted to allow for the passage of the fluid;

an annular collar that is positioned within the central core and retained between the first and second end caps, the annular collar is positioned closer to the second end cap than the first end cap and is adapted to be rotatable with respect to the filter media, the annular collar having a sidewall formed to include a series of space projections that extend radially inwardly from the sidewall and at least one of the space projections include a tapered tip that is situated near a bottom edge of the annual collar to assist in aligning the annular collar, wherein fluid contacting the filter travels radially inwardly through the filter media, into the central core and out through the central opening, the annular collar adapted to move axially with respect to the central core.

17. The filter of claim 16, wherein the central core include a series of radial fins formed on an exterior surface of the central core, the fins adapted to cause the fuel to rotate about at least a portion of the core.

* * * * *